United States Patent [19]
Flandroy

[11] 4,252,752
[45] Feb. 24, 1981

[54] HEAT EXCHANGE UNIT IN PARTICULAR FOR AN ATMOSPHERIC HEAT EXCHANGER

[75] Inventor: Myriam R. C. G. Flandroy, Brussels, Belgium

[73] Assignee: Hamon-Sobelco, S.A., Brussels, Belgium

[21] Appl. No.: 75,989

[22] Filed: Sep. 17, 1979

[30] Foreign Application Priority Data

Oct. 23, 1978 [EP] European Pat. Off. ........ 78400144.8

[51] Int. Cl.³ ............................................. B01F 3/04
[52] U.S. Cl. ....................................... 261/153; 165/60; 165/175; 165/DIG. 1; 261/112; 261/DIG. 11; 261/DIG. 77
[58] Field of Search ............... 261/111, 112, 152, 153, 261/155, DIG. 11, DIG. 77; 165/60, 175, DIG. 1

[56] References Cited

U.S. PATENT DOCUMENTS

| | | | |
|---|---|---|---|
| 662,612 | 11/1900 | Weightman | 261/DIG. 11 |
| 1,645,481 | 10/1927 | Grell | 165/175 X |
| 1,890,185 | 12/1932 | Lucke | 165/175 |
| 3,271,969 | 9/1966 | Lorentzen | 261/153 X |
| 3,292,998 | 12/1966 | James | 261/153 X |
| 3,385,352 | 5/1968 | Engalitcheff, Jr. et al. | 165/60 |
| 3,504,738 | 4/1970 | McGuffey | 261/153 X |
| 3,617,036 | 11/1971 | Brown | 261/111 |
| 3,635,042 | 1/1972 | Spangemacher | 261/DIG. 11 |
| 3,831,667 | 8/1974 | Kilgore et al. | 261/DIG. 11 |
| 3,844,344 | 10/1974 | Kliemann et al. | 261/DIG. 11 |
| 3,846,519 | 11/1974 | Spangemacher | 261/DIG. 11 |
| 3,865,911 | 2/1975 | Lefevre | 261/111 X |
| 3,899,553 | 8/1975 | Furlong et al. | 261/111 X |
| 3,913,667 | 10/1975 | Meylan et al. | 261/DIG. 11 |
| 3,923,935 | 12/1975 | Cates | 261/DIG. 77 |
| 3,925,523 | 12/1975 | Cates | 261/DIG. 77 |
| 3,977,431 | 8/1976 | Ovard et al. | 261/DIG. 11 |
| 3,995,689 | 12/1976 | Cates | 165/DIG. 1 |
| 4,003,970 | 1/1977 | Vodicka | 261/111 X |
| 4,114,683 | 9/1978 | Verlinden | 165/DIG. 1 |
| 4,183,897 | 1/1980 | Lanteri | 261/112 X |
| 4,196,157 | 4/1980 | Schinner | 261/155 |

FOREIGN PATENT DOCUMENTS

| | | |
|---|---|---|
| 771539 | 8/1970 | Belgium . |
| 1812111 | 6/1970 | Fed. Rep. of Germany . |
| 89627 | 5/1972 | Fed. Rep. of Germany . |
| 2626948 | 12/1977 | Fed. Rep. of Germany . |
| 2533021 | 10/1978 | Fed. Rep. of Germany . |
| 2842411 | 4/1979 | Fed. Rep. of Germany . |
| 1522450 | 3/1968 | France . |
| 2295395 | 7/1976 | France . |
| 2341095 | 9/1977 | France . |
| 2350145 | 12/1977 | France . |
| 2270539 | 1/1978 | France . |
| 2362358 | 3/1978 | France . |
| 2377596 | 8/1978 | France . |
| 2380488 | 9/1978 | France . |
| 2390697 | 12/1978 | France . |
| 1158244 | 7/1969 | United Kingdom . |

Primary Examiner—Richard L. Chiesa
Attorney, Agent, or Firm—Kerkam, Stowell, Kondracki & Clarke

[57] ABSTRACT

Heat exchange units are disclosed for exchanging heat between at least one fluid, for example water, and a gas, for example air, comprising at least one battery of heat exchange tubes which are parallel to each other and extend generally vertically and in which circulates one of the fluids. The gas, such as air, passes between the tubes of the battery generally transversely of the heat exchange tubes, and means are provided for selectively spraying a liquid on the heat exchanger tubes. The heat exchange units may be employed in atmospheric natural draft, or forced draft coolers, or cooling towers, or combinations of such draft-producing means may be employed in a single cooling tower.

12 Claims, 18 Drawing Figures

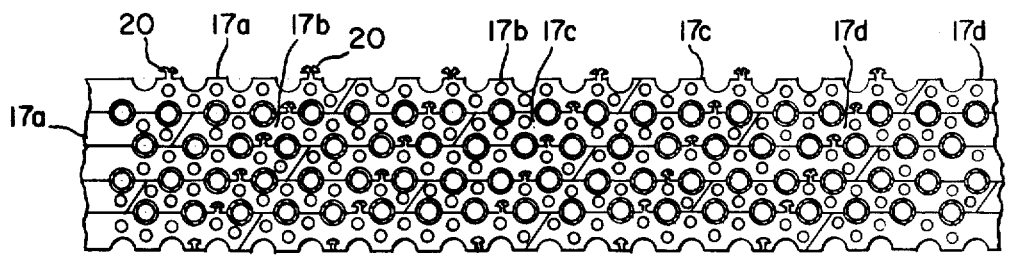
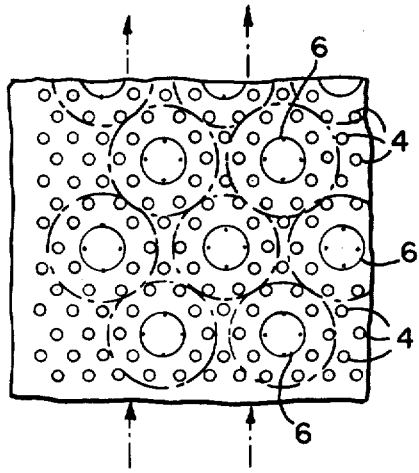
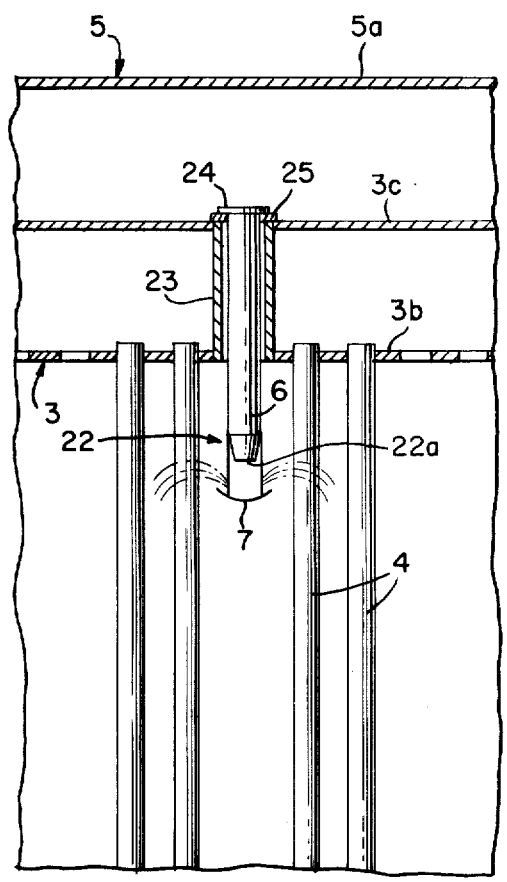

HEAT EXCHANGE UNIT IN PARTICULAR FOR AN ATMOSPHERIC HEAT EXCHANGER

DESCRIPTION

1. Technical Field

This invention relates to heat exchange units for exchanging heat between at least one fluid, for example water, and a gas, for example air of the atmosphere, of the type comprising a battery of heat exchange tubes which are parallel to each other and in which may circulate one of the fluids, the gas passing between the battery of tubes generally transversely of the exchange tubes, and means for spraying a liquid on exchange tubes, and the invention also relates to atmospheric heat exchangers provided with such heat exchange units.

2. Background of Prior Art

Atmospheric type heat exchangers comprise either a tower forming a chimney through which the air of the atmosphere travels by a natural draught, with possibly the assistance of one or more fans, or a simple contacting chamber provided with suction or blower fans. In both cases, the air of the atmosphere enters at the base of the installation and issues therefrom in the upper part after being in direct and/or in indirect contact with the fluid to be cooled in the heat exchanger unit.

In "wet" coolers, a liquid such as water is cooled directly by the air of the atmosphere, this liquid being distributed in the upper part of a "wet" exchange unit usually formed by corrugated planar sheets or plates, or grates of various shapes, on which the liquid runs and/or rebounds with splashing, whereas the stream of air of the atmosphere, which may enter by way of air inlet orifices of the cooler, flows in the exchange unit either in a perpendicular direction or in a direction opposed to the direction of flow of the liquid. It is usually said that the liquid is put in contact with the gas by cross-currents in the first case and counter-currents in the second case.

"Wet" coolers have the advantage of having very good heat exchange capacity ensuring satisfactory cooling even when the temperature of the air of the atmosphere is relatively high, as in hot countries, or in the summertime, in countries having a mild climate. On the other hand, such coolers have a major drawback, that when the temperature of the air of the atmosphere is low and damp, of expelling a wreath of humid steam or "plume". The wreath of "wet" coolers is a nuisance owing to the mist that it may cause and the resulting dangers to vehicular traffic if the mist is converted to rain, snow, ice, etc., which might be produced, to reduction of sunshine, to a modification of the microclimate, and to reduction of visibility.

"Dry" coolers in which the fluid, which is liquid, gaseous or mixtures thereof, travels through a "dry" or indirect contact exchanger comprising a wall which isolates it from the air of the atmosphere, have the advantage of avoiding, irrespective of the atmospheric conditions, the formation of a wreath at the outlet of the cooler. Such an exchanger may be formed, for example, by batteries of tubes through which flows the fluid to be cooled. It is conventional to employ for such exchangers metal tubes having fins, but owing to their cost and problems of corrosion there is a tendency to substitute therefor tubes of plastics material. Such exchangers comprise hundreds or thousands of tubes of small diameter and from several to more than twenty meters in length. Such tubes have poor heat conductivity so that the cooling obtained may be insufficient, or the number of tubes must be multiplied excessively.

In order to conciliate the advantages of "dry" coolers and "wet" coolers, "combined" coolers have been constructed which associate wet or direct contact exchangers and dry or indirect contact exchangers, through which the air streams flow in parallel or in series. In these "combined" coolers, in cold and damp weather, the "dry" exchangers are essential for drying the air expelled by the "wet" exchangers whereas the latter may be redundant in cold weather. Since "wet" exchangers are subject to freezing, arrangements must be made to prevent freezing, such as a partial or complete removal from service, throttling of the air flow, or reduction in the number of stages of the "wet" exchanger unit, as described, for example, in French Patent Application NO. 76 32 013.

On the other hand "combined" coolers, in the summertime when the weather is hot and dry, the wreath which is produced solely by the wet exchange unit, would be absent or sufficiently small not to be disadvantageous. The "dry" exchanger is then of little use; and if it remains in operation, it may even be harmful owing to the pressure drops that it creates in the stream of air passing therethrough, whether this stream be in parallel or in series relative to the "wet" exchanger. If the exchangers are disposed in parallel as concerns air flow path, it may even be necessary to partly or completely close the supply of air to the "dry" exchanger so as to increase the induced air flow through the "wet" exchanger and lower the temperature of the cooled water which, during hot weather, is often disadvantageously high.

As can be seen with "combined" coolers, the wet section of which is often dimensioned to avoid exceeding in the summertime a maximum temperature of cooled water and the dry section of which is dimensioned so as to reduce the wreath in the winter time, rarely use both sections simultaneously with full efficiency.

Many patents relate to "combined" coolers exemplary of which are: U.S. Pat. Nos. 3,923,935; 3,925,523; FR Pat. No. 2 295 395; U.S. Pat. Nos. 3,899,553; 3,844,344; 3,846,519; 3,635,042; GB Pat. No. 1,158,244; U.S. Pat. No. 3,831,667; FR Pat. Nos. 2 270 539; 77 00 748; and 76 32 013.

A substantial improvement over the foregoing designs of "combined" coolers resides in the use of "hybrid" exchange units, that is to say exchange units which may be of the "dry" type and/or the "wet" type, depending on how they are used, and which may be switched from operation as a "wet" exchanger to operation as a "dry" exchanger, and vice-versa. Such heat exchange units are therefore "hybrid" exchangers, the pipes of which may be traversed internally by the fluid to be cooled and may be sprayed externally by this same fluid. The "combined" coolers may comprise a "wet" exchanger operating throughout the year, with which there are associated "hybrid" exchangers all of which operate, in cold and damp weather in the purely "dry" mode, and in hot and dry weather in purely "wet" mode and which, between these extreme conditions may be divided into elements operating as "wet" exchangers and as "dry" exchangers.

Patent Application DE-OS No. 1 812 111 and U.S. Pat. No. 3,865,911 describe such "combined" coolers which are designed for reducing the wreath of steam, with the "wet" and "dry" exchangers being disposed for serial air flow, and the "dry" exchangers being formed by layers of horizontal tubes and being capable of being sprayed with the liquid to be cooled to operate as "hybrid" exchange units. In both cases, the spraying of layers of finned metal tubes renders the problems of corrosion more difficult.

On the other hand, Patent Application FR Pat. No. 2 289 868 describes "hybrid" exchangers wherein the horizontal pipes are formed of polymer organic material to thereby reduce corrosion. When operating in the "dry" manner, these exchangers operate with cross-current air flow and when operating in the "wet" manner, they operate with counter-current air flow. The hydraulic connections for the operation as a "dry" exchanger are lateral and the spraying of the pipes is achieved by spray means disposed above the pipes of the exchanger.

However, the liquid flowing in the "dry" sections of such "hybrid" exchangers is the same liquid that flows through the "wet" sections, where the liquid collects dust carried by the air (all "wet" coolers are air washers), and this dust is later deposited in the horizontal pipes of the exchangers and finally hinders the circulation of the liquid to such an extent as to render the operation of the installation impossible. These deposits are particularly rapid at low liquid flow rates. Flow rates are often low in large installations in order to avoid prohibitive pressure drops.

It is practically impossible to clean the narrow pipes, which may reach several meters, and even several tens of meters in length.

The vertical disposition of the pipes or tubes of "dry" exchangers avoids the obstruction of the pipes by solid impurities contained in the liquid passing therethrough since these impurities fall into the lower water boxes or basins where they may accumulate for a long time before requiring cleaning. The cleaning operation of water boxes does not present a major difficulty. However, the known structures of "hybrid" exchangers do not solve the problem of surface wetting of the entire "dry" exchanger having vertical tubes or pipes since the upper hydraulic connection (a water box or a flume or a tray) for the internal feeding prevents external spraying of the exchanger pipes from top.

As to a frontal spraying of such exchangers, such spraying is ineffective. For example, if an exchanger is formed by thirty rows of tubes, water sprayed onto a front face of the exchanger tubes will partly rebound and fall directly onto the ground and partly flow along the first two rows of tubes, the third row of tubes hidden by the preceding two rows may still be wetted by a tearing and driving of the water, but the following twenty-seven rows will have no "wet" exchanger efficiency.

BRIEF SUMMARY OF INVENTION

An object of the invention is therefore to provide a heat exchange unit of the "hybrid" type, which notwithstanding that the tubes are arranged vertically or are steeply inclined to the horizontal, can be sprayed from the exterior in a uniform manner.

According to the invention, there is provided a heat exchange unit of the "hybrid" type, having cooling tubes which are vertical or inclined steeply to the horizontal, which tubes are connected in a sealed manner at their upper ends to a first horizontal header, distributor or collector of the liquid to be cooled. A series of spray tubes are provided with, at their lower ends, liquid spraying devices and are disposed alternately and parallel with the exchanger tubes. The spray tubes are connected at their upper ends to a second horizontal header or distributor of the liquid to be sprayed. The first distributor or collector device and the second distributor device are disposed one above the other and the tubes which are connected to the upper header extend in a sealed manner through the lower header device. With this arrangement, it is possible to supply liquid, as desired, to the exchanger tubes, or the spraying tubes or both at the same time, which enables the exchanger to be operated respectively, either in a "dry" mode, or in a "wet" mode, or in a "hybrid" mode. The vertical disposition of the tubes avoids their obstruction by deposits whereas the arrangement of the spraying tubes alternately with the exchanger tubes guarantees uniform spraying of the outer surface of the tubes throughout the section of the exchanger.

The invention also relates to the application of such heat exchangers in a "dry" atmospheric cooler, or in a combined atmospheric cooler.

The spraying of the exchanger tubes with a liquid, usually water, improves the heat exchanger efficiency as the air cools on the basis of its "wet" temperature which is always lower than the "dry" temperature when the relative humidity is lower than 100%, thereby increasing the temperature difference between the cooling fluid (air+water) and the cooled fluid.

The tubes of the exchanger generally have a fluid flow internally, whereas the tubes are sprayed externally only when the atmospheric conditions and the thermal load require it.

Carrying out the present invention in "combined" coolers, the liquid sprayed on the exchanger tubes is the liquid which is cooled in the "wet" exchanger. The heat exchange unit operates as a "dry" exchange unit, when the tubes are not sprayed. The "combined" cooler operates as a "wet" exchange unit when the tubes are sprayed, and in this case, it is not thermally necessary that the liquid to be cooled pass through the tubes, and the tubes can then be empty of the liquid in which case they normally contain stagnant humid air. In this case, the "combined" cooler in fact operates solely as a "wet" cooler.

BRIEF DESCRIPTION OF DRAWING

Other features and advantages of the invention will be apparent from the more detailed description which follows, with reference to the accompanying drawing which show various embodiments and in which:

FIG. 2a is a view similar to FIG. 2 but in which the battery has a longitudinal pitch which is different from the transverse pitch;

FIG. 9 is a view like FIG. 8 further illustrating the FIG. 8 form of the invention;

FIG. 10 is a view similar to FIG. 2 of another arrangement ot the tubes;

FIG. 11 is a view similar to FIG. 1 of a modification of the assembly of the spraying tubes;

With reference to FIGS. 1 and 2, the heat exchanger 1 comprises a liquid distributing unit 2 formed by a lower water box 3 supplying water to a battery of exchanger tubes 4 and an upper water box 5 disposed above the water box 3 and supplying water to the spray tubes 6.

Figure 1:
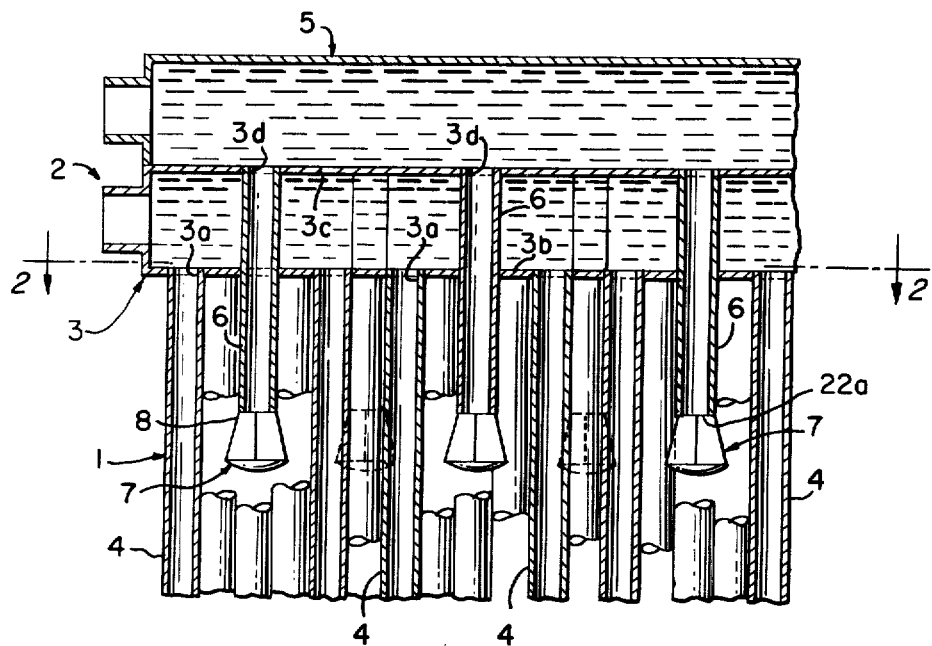
FIG. 1 is a partial elevational and sectional view of a heat exchange unit according to the invention.

Preferably, the tubes 4 are flexible tubes of organic polymer material such as those described in U.S. Pat. No. 4,114,683 and Gr. DE No. 2 842 411. These tubes have, for example, an outside diameter of 15 mm and an inside diameter of 13 mm. In the illustrated embodiment, the battery comprises in the direction of its width 23 longitudinal rows of tubes disposed in staggered relation. The spacing between the tubes 4 transverse to the direction of air flow is, for example, 25 mm and the longitudinal spacing is 30 mm. The thickness or width of the battery of tubes is therefore 23 mm×25 mm=0.575 m. Its length is a function of the heat capacity of the cooler: as a minimum, it is of the order of a meter, and, as a maximum, it may be as much as several tens of meters, and even several hectometers in the case of coolers for large electronuclear power stations evisaged at the present time.

The tubes 4 should be as long as the thermal and technological characteristics of the installation in which the battery is mounted will allow in order to minimize the cost of the connections of the tubes to the water boxes per meter length of tube as these connections constitute the most expensive parts of an exchanger. The contemplated tube lengths are between a few meters and about twenty meters, but this range is not intended to be limitative.

At their lower ends, the tubes 4 may either be connected to a lower water box, not shown, or discharged directly in a liquid collecting trough or channel.

At their upper ends, the exchanger tubes 4 are fixed in a sealed manner in orifices 3a of a plate 3b constituting the bottom of the water box 3. The sealed connection between this plate 3b and the tubes 4 may be ensured by any suitable means, for example, by devices (not shown) such as those described in Patent Applications FR Pat. No. 2 341 095 and FR Pat. No. 77 04 168.

Periodically, both in the transverse direction and in the longitudinal direction, the base 3b is devoid of exchanger tubes, but the tubular plate 3b includes orifices 3a corresponding to these missing tubes, through which orifices pass the spray tubes 6 which extend through the water box 3. In the illustrated embodiment, one tube 4 in three is replaced in the longitudinal direction and in the transverse direction by a spray tube 6. The upper ends of the tubes 6 extend through the plate 3c which constitutes the upper plate of the water box 3 and the bottom of the water box 5 and are fixed in a sealed manner in the orifices 3d of the plate 3c.

The spray tubes 6 extend from a few centimeters to a few decimeters under the plate 3b and terminate in a conventional spray head or device 7 which produce jets of liquid to issue from the lower ends 8 of the tubes 6. The spray devices 7 may be, for example, of the type disclosed in the Patents or Patent Application Nos. FR 1 522 450, BE 771 539, DE PS 89627, FR 2 350 145, DE 25 33 021, DE 2 626 948, U.S. pat. No. 3 617 036, or any other type known in the art.

Figure 2:
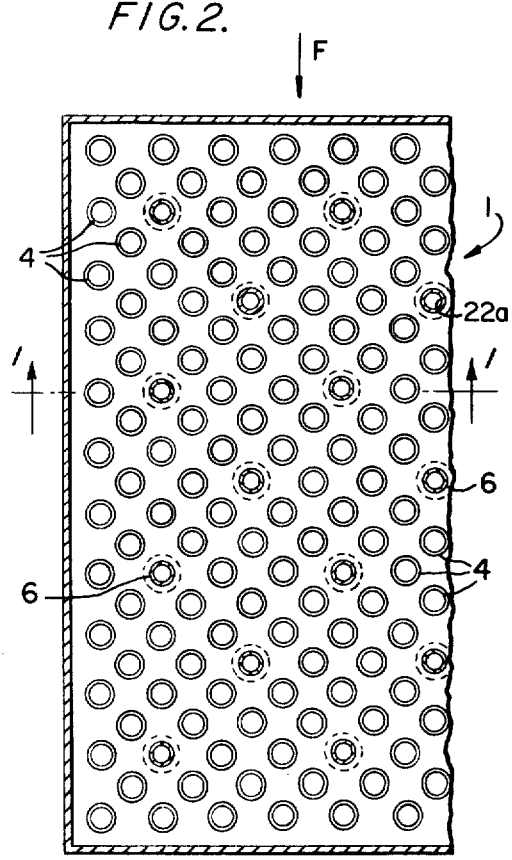
FIG. 2 is a sectional view taken on line 2—2 of FIG. 1.
Figure 2:
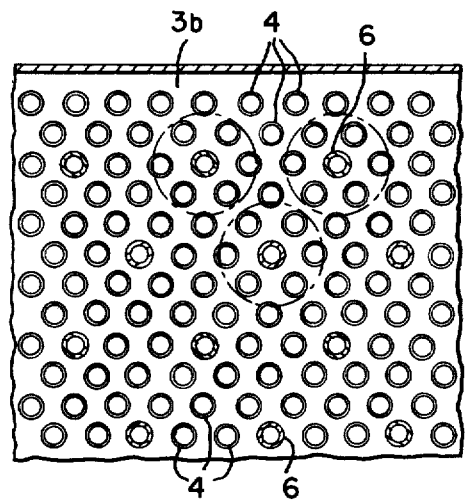

In operation, the exchanger tubes 4 are supplied with fluid to be cooled or condensed by the distributor device 3, conventionally called a water box, whereas the spraying tubes 6 are supplied with liquid, which is usually water, via the upper water box 5. The gas, which is air of the atmosphere in the case of atmospheric coolers, flows through the battery of tubes transversely of the latter in the direction indicated by the arrow F, FIG. 2. In the embodiment shown in FIG. 2, the transverse spacing of the tubes may be the same as the longitudinal spacing, but if, as shown in FIG. 2a, the transverse spacing of the tubes is 25 mm, and the longitudinal spacing is 30 mm, each spray head 7 is therefore surrounded by six exchanger tubes 4, which are roughly at equal distances apart, and at the centre of the triangle formed by three contiguous spray heads 7, there is a tube 4 which is not part of the three groups of six tubes of the particular spray head 7, and is sprayed partly by each of three adjacent spray heads 7 via the space between the other tubes. With a network of tubes 4 of 30 mm×25 mm, the outer perimeter of a tube 4 equal to $\pi \times 15$ mm and one tube 4 in nine absent, the wetted perimeter is:

$$\frac{\pi \times 0.015 \times 8/9}{0.030 \times 0.025} \simeq 56 \text{ m/m}^2$$

which value is of the order of magnitude of good "wet" exchange units having a "film" of liquid running down each tube.

For a head of water of H(m) in the water box 5, the flow through the orifice 22a of section $\Omega$ (m$^2$) of any tubes 6 is given by Toricelli's formula:

$$Q = \Omega \times \alpha \sqrt{2gH}$$

where $\alpha$ is the efficiency of the orifice. For water and an orifice having a diameter of 8 mm, $Q \simeq 0.5$ m$^3$/hr. With a network of the system of spray tubes 6 equal to 90 mm×75 mm, the specific flow is of the order of 80 t/(m$^2$·hr) corresponding to the high flows of cross-current running-water "wet" exchangers.

Figure 3:
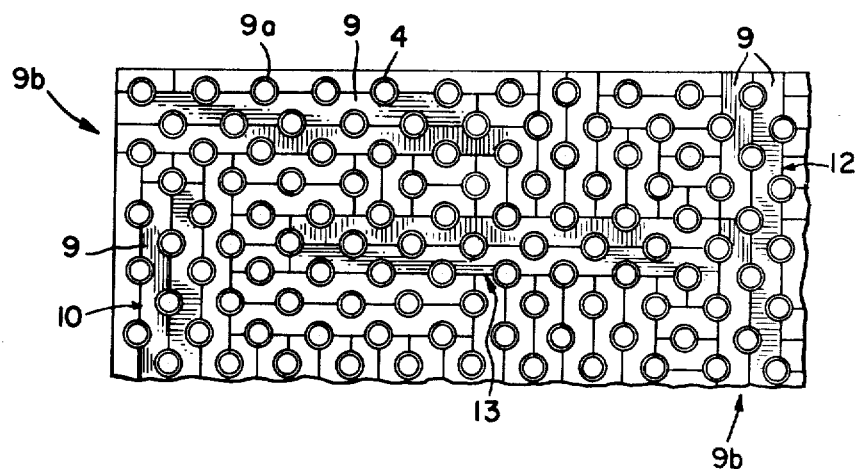
FIG. 3 is a partial view in plan and in section of the tube spacer devices.

As shown in FIG. 3, in order to avoid groupings of the tubes 4 that would create priviledged passages for the gases and the spraying liquid, adequate spacer devices 9b must be provided. These devices may be of the type described in Patent Application. FR Pat. No. 2 362 358 and German DE Pat. No. 2 842 411 but, owing to the fact that in these patents the spacer strips are solid and contiguous and would be an obstacle to the flow of the water on the external surface of the tubes, their arrangement must be modified for the application of the exchanger according to this invention, that is to say they must be grouped in independent pairs which are not contiguous with another pair, each surrounding a row or a fraction of a row (in particular for batteries of great length) of tubes. A pair of parallel strips 9 provided with notches 9a for the tubes 4 constitutes a spacer 9b and, in FIG. 3, the reference numeral 10 designates a transverse spacer surrounding a full row of tubes, the reference numeral 11 designates a longitudinal spacer surrounding a fraction of a full row, whereas the reference numberal 12 and 13 respectively designate a transverse spacer and a longitudinal spacer surrounding a transverse row and a fraction of a longitudinal row in which one tube in three is missing, this being due to the fact that the spacers are placed in the battery of tubes below the spray heads of tubes 6. Depending on the height of the exchanger, that is to say the length of the tubes, there may be provided a single spacer or a plurality of spacers which are superimposed as shown in FIG. 4 for each longitudinal row of tubes 4.

Figure 5:
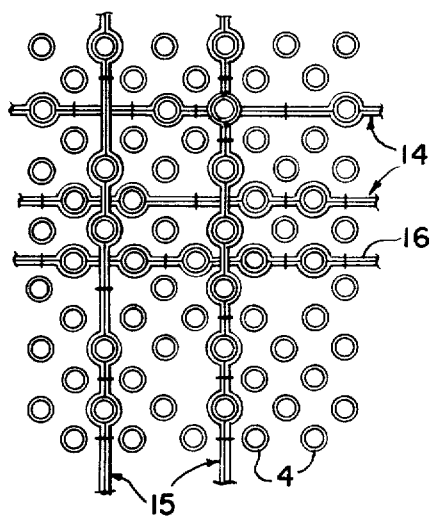
FIG. 5 is a view similar to FIG. 3 of a modification of the spacer devices.
Figure 6:
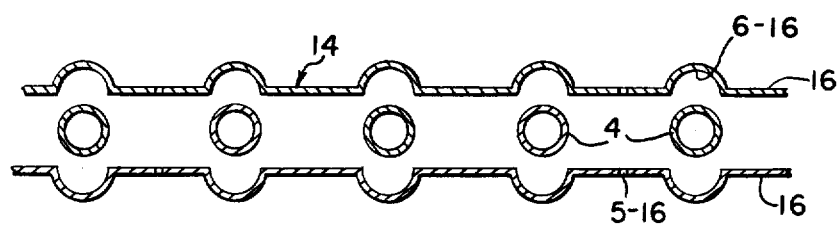
FIG. 6 is an exploded view of a portion of a pair of spacer devices shown in FIG. 5.
Figure 7:
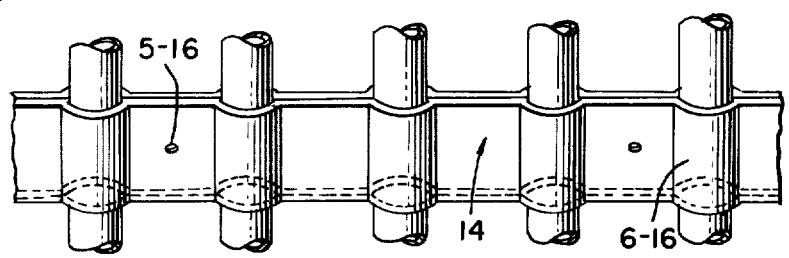
FIG. 7 is a perspective assembled view of the structures shown in FIG. 5.

FIGS. 5, 6 and 7 show another type of spacer device in which the longitudinal spacers 14 and transverse spacers 15 are composed of two members 16 of a material which does not readily corrode or of an organic polymer material having sufficient stiffness to keep their shapes. The pairs of members of each spacer 16 are joined by rivets or the like 5-16 at their faces and have deformations 6-16 which define cavities for receiving the tubes 4. These members 16 may be maintained against each other by other known means, in particular by adhesion, nailing, screwing, pinching, clamping or any other connector means.

Figure 4:
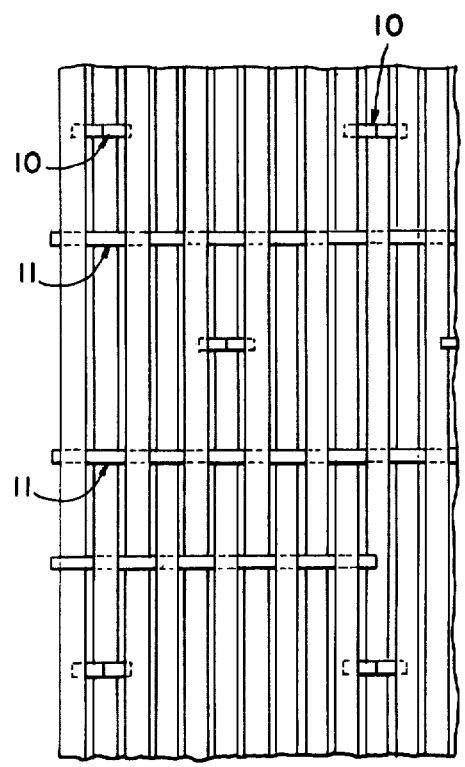
FIG. 4 is a partial elevational view of the exchanger of FIG. 3.
Figure 8:
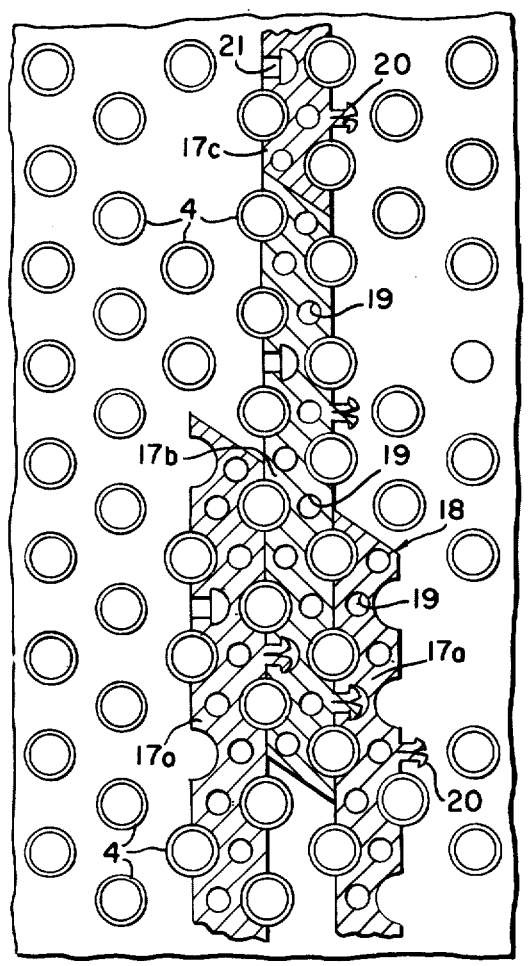
FIG. 8 is a view similar to FIG. 3 of another modification of the spacer devices.

FIGS. 8 and 9 show another modification of the spacer devices formed by strips 17a, b, c, etc., similar to the strips 9 of FIGS. 3 and 4, but in which all the strips are disposed in the same plane and are provided with apertures 19 for the flow of the sprayed liquid throughout the height of the exchanger. As illustrated, the strips 17a, b, c, etc. may be provided with projections 20 and cavities 21 which fit these projections to clip the elements 17a, b, c, etc. together. In general, the strips 17a, b, c, etc. of one row are offset relative to the strips of the two adjacent rows so as to ensure an indirect connection between the strips disposed in end-to-end relation in the same row.

The effect of the spacers on the efficiency of the exchanger in "wet" operation is advantageous as the spacers break the liquid film, which effect is provided in conventional "wet" exchangers by the provision of apertures of projections for improving the efficieny of heat exchange. The spacers cause the liquid to rebound and respread, which breaks up the large streams of water which could form.

It must be understood that the invention is not limited to exchangers whose dimensions and arrangement of tubes are those just described. In particular, the inside and outside diameters of the exchanger tubes and the spray tubes may be larger or smaller than those mentioned. Or, as shown in FIG. 10, the spray tubes 6 which extend through the liquid distribution box 3 in a sealed manner may be of a distinctly larger diameter than that of the exchanger tubes 4.

In the embodiment shown in FIG. 10, the larger diameter of the spray tubes 6 requires the elimination of two exchanger tubes 4 in a longitudinal row of tubes and one exchanger tube 4 in each of the adjacent longitudinal rows. As described before, both in the longitudinal direction and in the two oblique directions, two spraying tubes 6 surround two plastic exchanger tubes 4 so as to achieve good spraying of the exchanger tubes. There are twelve exchanger tubes per spray tube: each spray tube is directly surrounded by ten exchanger tubes, but as at the centre of the triangles formed by three adjacent spray tubes, there is an exchanger tube which receives its liquid spray indirectly from the three spray tubes, and as there is in this staggered arrangement six indirectly sprayed exchanger tubes around each spray tube, a spray tube therefore operates on $10 + 6 \times \frac{1}{3} = 12$ exchanger tubes.

In the case of spray tubes 6 of larger diameter such as shown in FIG. 10, the larger diameter of these tubes enables mounting thereon at the lower end, nozzles 22 for regulating the flow, as shown in FIG. 11. The diameter of the nozzles 22 required for proper flow is distinctly less than the diameter of the tubes 6. The small orifice 22a of these nozzles render them liable to stop up, but this drawback may be overcome by providing means for servicing the nozzles. In the embodiment shown in FIG. 11, these means comprise a sleeve 23 fixed in a sealed manner at each end in apertures of the end plates 3b and 3c of the lower water box 3 and the upper water box 5 respectively, the spray tubes 6 extend, with clearance, through the sleeve 23 and having in its upper part a retaining shoulder 24 which bears against the plate 3c. Further, a sealing washer 25 may be provided between the shoulder 24 and the plate 3c. In order to service the nozzles 22, the tubes 6 are withdrawn through the sleeves 23 and, for this purpose, the upper plate 5a of the water box 5 is removable. This plate 5a may also be eliminated, as moreover in the previously described embodiments, and the distributing device 5 is then formed as a simple open-top tank.

It must be understood that many modifications may be made in the embodiments described hereinbefore without departing from the scope of the invention. Thus, for example, the lower and upper water boxes 3 and 5 may be divided transversely and/or longitudinally into compartments, so as to achieve the number of passes required for the good hydraulic and thermal operation of the exchanger. Further, the exchanger tubes 4 may be other than smooth and have projections or extensions on their surface as described, for example, in FR Pat. No. 2 295 395, so as to improve heat exchanger, both in the "wet" and "dry" modes of operation. Such projections, coupled with tube clamping means, may also act as spacer means.

Figure 12:
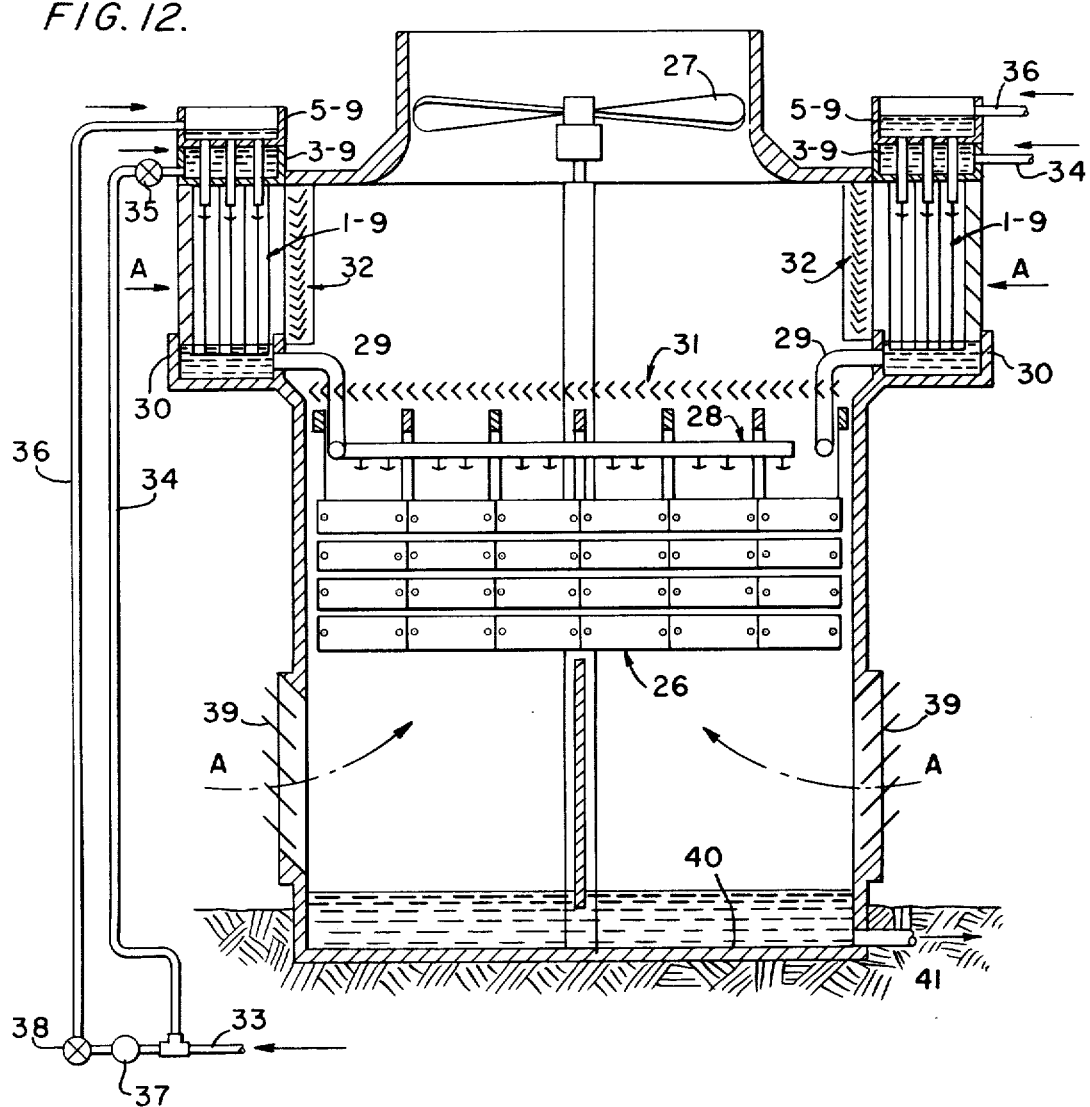
FIG. 12 is an elevational and sectional view of an atmospheric aero-cooler equipped with exchangers according to the invention.

With reference now to FIG. 12 which shows a "combined" atmospheric cooler equipped with "hybrid" exchangers according to the invention, the cooler is of the type having a suction fan and comprises a "wet" exchange unit 26 employing countercurrent and "hybrid" heat exchange units 1-9 in which the streams of air of the atmosphere enter in parallel in the direction of the arrows A, and thereafter become mixed in the cooler upstream of the fan 27. Further, this cooler comprises: a system 28 for distributing liquid, for example water, to the "wet" exchange unit 26; tubular sleeves 29 connected to the distribution system 28; header tanks 30 of the exchangers 1-9 into which is poured both the liquid flowing in the exchanger tubes and the liquid sprayed onto the latter; a pipe 33 supplying liquid to be cooled from which extends, for each of the exchangers 1-9 disposed on each side of the cooler, a pipe 34 for supplying the liquid to the water box 3-9 provided with a valve 35 and a pipe 36 supplying liquid to the water box or tank 5-9 in which are inserted in succession an overpressure pump 37 and a valve 38. The cooler also comprises: droplet separators 31 above the "wet" heat exchanger 26 and droplet separators 32 placed behind the exchangers 1-9 for reducing the droplets carried by the air stream when the exchangers 1-9 are sprayed; orientable flaps or slats or louvers 39 in the air inlets for the "wet" exchanger 26; a tank 40 for receiving the liquid flowing from the "wet" exchanger 26 and a pipe 41 for discharging the cooled liquid from the tank 40.

In cold weather, when it is essential to reduce the plume to a minimum, the cooler is supplied with hot liquid by the pipe 34; this liquid, which is usually water, flows in one or more passes through the exchangers 1-9 and reaches the distribution system 28 of the "wet" exchanger 26, through which it runs and finally falls into the tank 40. The pumps 37 are then inoperative and the valves 38 are closed so that the exchanger tubes of the exchangers 1-9, which may be any of the types described hereinbefore, are not sprayed. If the weather is very cold, and there is a danger of freezing the water in the "wet" exchange unit, it is possible to either throttle the air flow through the "wet" exchange unit 26 by partly closing the louvers 39, or use any other means known in the art for countering freezing in "wet" coolers.

In hot weather, when there is no wreath, the valves 38 are opened and the pumps 37 are operated so that the water to be cooled arrives in the cooler also by way of the pipes 36 and thus produces a spray for the exchanger tubes of the exchanges 1-9, and provides a distinct improvement in the thermal efficiency of these exchanger tubes.

For large cooler units, which are either multicellular or have a large number of exchangers 1-9, it is possible to operate a certain number of the exchangers 1-9 as dry exchangers and the others as "wet" exchangers so as to adapt as well as possible the operation of the cooler to the meteorological conditions, to its thermal load and to the desired quality of cooling. Such regulation may be effected on a single exchanger 1-9 when the distribution of the spray water may be modulated, for example, by dams placed in the tank 5-9 and dividing the latter into a plurality of compartments so that a chosen number of compartments alone are supplied with water.

Figure 13:
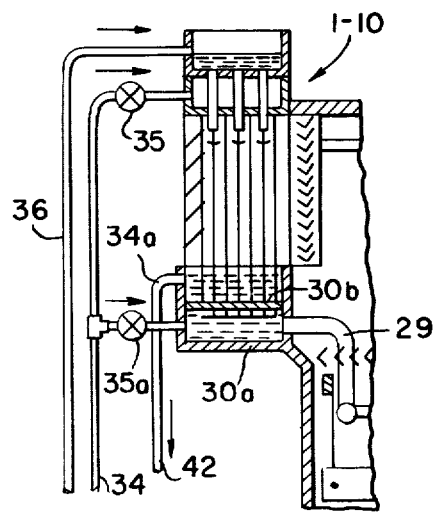
FIG. 13 is a detail view of a modification of the fluid-collecting circuit of the exchanger for use in the cooler of FIG. 12.

It will be understood that may modifications may be contemplated as concerns the supply of hot liquid and the discharge of the cooled liquid for the exchangers 1-9 and 26. FIG. 13 shows one of these modifications in which the common tank 30 of FIG. 12 is replaced by a water box 30a with which communicate the exchanger tubes of the associated exchanger 1-10 and which is surmounted by a tank 30b which receives solely the spray water from the exchanger tubes. There is also provided on the pipe 34 a branch-pipe 34a which is provided with a valve 35a directly connected to the water box 30a, and a pipe 42 which discharges the water received in the tank 30b directly into the tank 40.

This embodiment has the advantage over that of FIG. 12 of permitting, in the summertime, by-passing the "dry" part of the exchangers 1-10 by closing the valve 35 and opening the valve 35a, the cooler then operating solely as a "wet" cooler. The pipe 42 is provided in the case where the "wet" cooling in the exchangers 1-10 is sufficient to lower the temperature of the water to the required value but, of course, it could also be arranged to connect the pipe 42, for example, to the sleeve 29 or to a lower water distribution system (not shown) such as described in the Patent Application FR Pat. No. 7 632 013, to achieve further cooling of the exchanger 26.

Figure 14:
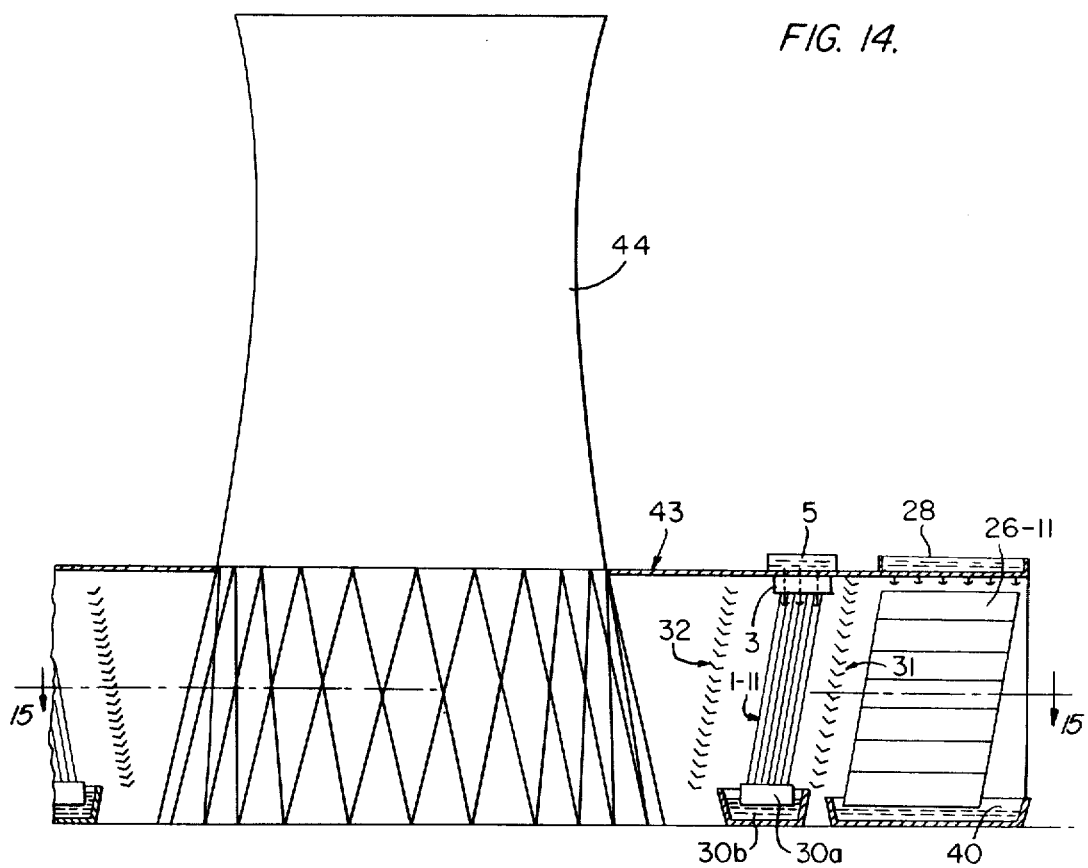
FIG. 14 is an elevational and sectional view of another type of "combined" cooler equipped with an exchanger according to the invention.
Figure 15:
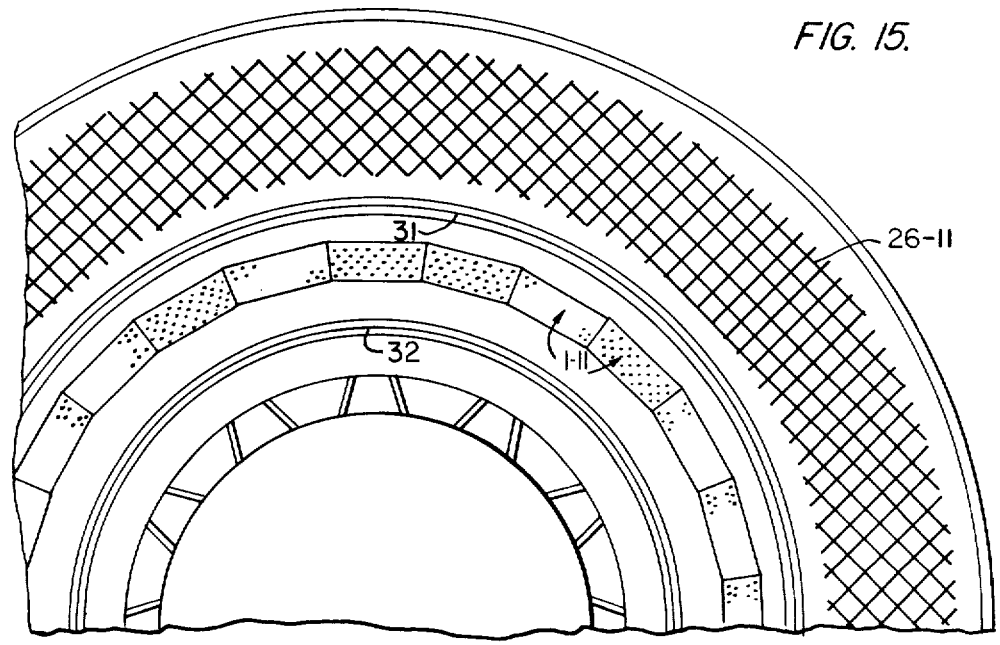
FIG. 15 is a sectional view taken on line 15—15 of FIG. 14.

FIGS. 14 and 15 show the application of the heat exchangers according to the invention to a natural draught cooler. The same reference numerals as in FIGS. 12 and 13 have been used to designate similar elements. This cooler comprises, in the conventional manner: a peripheral gallery 43 surrounding a natural draught chimney 44, the exchangers 26-11 and 1-11 being disposed one behind the other in the gallery so that atmosphere air, which enters the gallery 43 and issues therefrom by way of the chimney 44, passes through these exchangers one after the other. The hydraulic connection for the exchangers 1-11 and 26-11 may be of the series or parallel types and many variants may be imagined in this respect, as is clear from the description of FIGS. 12 and 13. It will be understood that the arrangement described hereinbefore could just as well be applied to a mechanical draught cooler.

Figure 16:
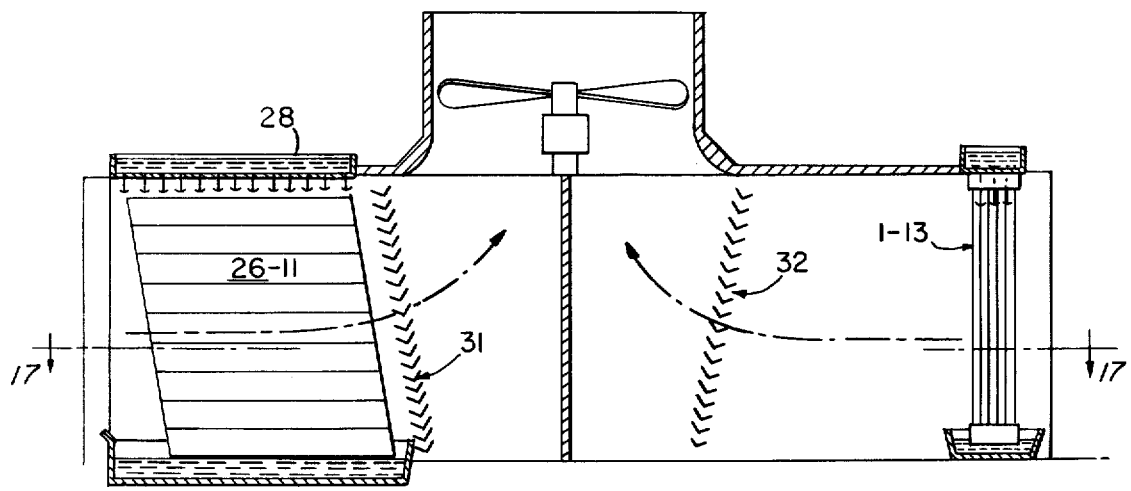
FIG. 16 is an elevational and sectional view of a third type of "combined" cooler provided with an exchanger according to the invention.
Figure 17:
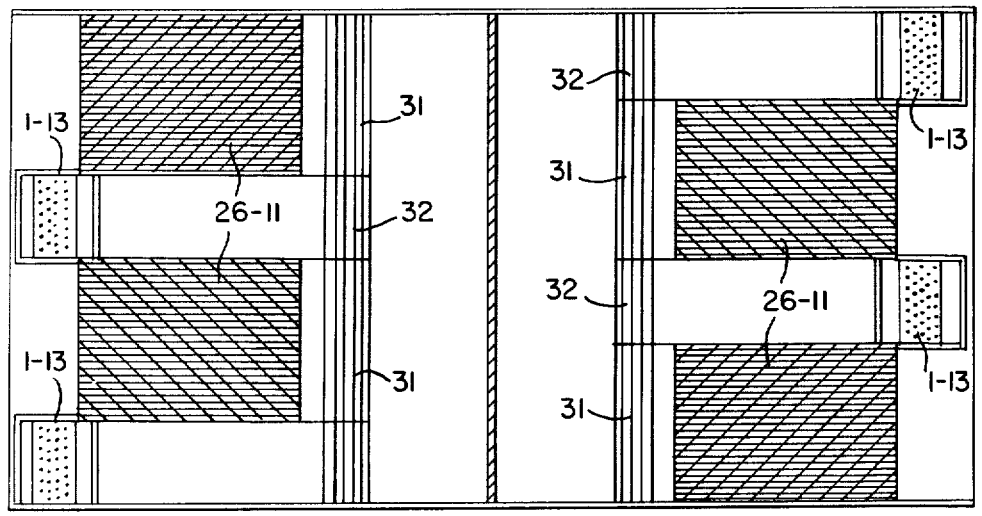
FIG. 17 is a view in plan and in section on line 17—17 of FIG. 16.

FIGS. 16 and 17 illustrate an application of the "hybrid" exchanger to a mechanical draught cooler of rectangular shape in which the heat exchangers are provided on two opposite sides of the cooler. In this embodiment, the "wet" exchangers 26-13 alternate with "hybrid" exchangers 1-13, so that parallel streams of atmospheric air flow therethrough, as in the embodiment shown in FIGS. 12 and 13.

It will be understood that many modifications may be contemplated both as concerns the positiioning of the "hybrid" exchangers according to the invention in an atmospheric cooler or other installation and as concerns the design of these exchangers. In this respect, note in particular that the position of the water boxes of distributing devices 3 and 5 could be reversed, the device 3 being above and the device 5 below with the exchanger tubes 4 extending through the water box 5.

Note that, in either of the relative positions of the distributing devices, the sealing of the connection of the tubes in the bottom plate of the spray liquid distributor need not be perfect if the liquid used for the spray is the same as that which flows in the exchanger tubes.

In the case of FIG. 1, in which the liquid distributing device 5 is above the collector or distributor device 3 for the fluid supplied inside the exchanger tubes, either the device 5 is supplied and the device 3 is not, and the liquid escaping in the region of the connections of the tubes 6 in the plate 3c flows into the box 3 and the tubes 4, or the device 3 is supplied and the liquid under pressure can escape from the box 3 to the box 5; if the box 5 is not supplied there is no drawback. On the other hand, if the box 5 is not supplied because the tubes 4 may not be sprayed, the liquid reaching the box 5 must be prevented from entering the tubes 6. For this purpose, it could be arranged to extend the tubes 6 above the plate 3c, and collect the escape flow on the level of this plate in the device 5.

In the case of the reverse configuration of the distributing devices 3 and 5, escape of liquid can only occur when the device 5 is distributing spray liquid which is then of no inconvenience since the exchanger tubes 4 are moreover sprayed by the tubes 6.

Statement of Industrial Application

Heat exchanger and cooling tower containing such heat exchangers have substantial industrial application in cooling exhaust steam from power producing plants and other industrial plants.

I claim:

1. Heat exchange unit between at least one fluid, for example water, and a gas, for example atmosphere air, comprising:
   a battery of generally parallel heat exchange tubes;
   means for directing a gas between the tubes of said battery transversely of said heat exchange tubes;
   means for spraying a liquid onto the external surface of said tubes;
   characterized in that said tubes are vertical or steeply inclined to the horizontal and are connected at their upper ends to a first horizontal header or fluid distributing device;
   said spray means comprising a series of spray tubes disposed in alternate parallel relation to said heat exchange tubes;
   connecting means at the upper end of each spray tube;
   a second horizontal distributing device for the liquid to be sprayed, connected to said connecting means;
   said first header or distributing device and said second distributing device being disposed one above the other, and the tubes connected to the device placed above, extending through the device placed there below.

2. An exchange unit as claimed in claim 1, wherein the second distributing device is disposed above the first distributing device or header and the spray tubes extend through said first distributing device.

3. An exchange unit as claimed in claim 1, wherein the first distributor device or header is disposed above the second distributing device and the exchanger tubes extend through the second device.

4. An exchanger unit as claimed in claim 2, wherein said tubes extending through a distributing device extend through orifices formed in a lower plate constituting the bottom of the lower device and an upper plate constituting the top of the lower device and bottom of the upper device.

5. An exchange unit as claimed in claim 4, comprising sleeves fixed in the orifices of said lower and upper plates and said spray tubes are releasable mounted in said sleeves.

6. An exchange unit as claimed in claim 5, wherein said tubes have at their upper ends a shoulder which bears against the bottom of the second distributing device.

7. An exchange unit as claimed in claim 4 or 5, wherein the tubes or the sleeves are sealed in the plate constituting the bottom of said first distributing device or header.

8. An exchange unit as claimed in claim 6, wherein a sealing element is interposed between said shoulder and said bottom.

9. An exchange unit as claimed in claim 1, wherein each of said spray tubes has at its lower end a liquid spray head.

10. An exchange unit as claimed in claim 9, wherein said spray head comprises a flow regulating nozzle.

11. An exchange unit as claimed in claim 1, wherein the heat exchange tubes are arranged in a staggered manner in parallel rows, with uniform spacing in the longitudinal and transverse directions, and, in uniformly spaced apart regions, from which at least one heat exchange tube is omitted, and each spray tube occupying at least partly said region.

12. An atmospheric cooler, characterized in that it includes at least one heat exchange unit according to claim 1.

* * * * *